(12) United States Patent
Okita

(10) Patent No.: US 8,783,636 B2
(45) Date of Patent: Jul. 22, 2014

(54) HOLDING DEVICE OF CYLINDRICAL BODY AND MICROPHONE HOLDER

(75) Inventor: Shioto Okita, Machida (JP)

(73) Assignee: Kabushiki Kaisha Audio-Technica, Machida-shi (JP)

(*) Notice: Subject to any disclaimer, the term of this patent is extended or adjusted under 35 U.S.C. 154(b) by 0 days.

(21) Appl. No.: 13/559,098

(22) Filed: Jul. 26, 2012

(65) Prior Publication Data
US 2013/0062479 A1 Mar. 14, 2013

(30) Foreign Application Priority Data
Sep. 8, 2011 (JP) ................................. 2011-195601

(51) Int. Cl.
*H04R 9/08* (2006.01)
*H04R 1/08* (2006.01)
*F16M 11/04* (2006.01)

(52) U.S. Cl.
CPC .............. *F16M 11/041* (2013.01); *H04R 1/08* (2013.01)
USPC ........ 248/316.3; 381/363; 381/368; 381/366; 248/313.5; 248/231.51; 248/689; 24/495; 24/303

(58) Field of Classification Search
USPC ........... 248/688–689, 67.7, 74.2, 74.1, 206.5, 248/229.11, 229.1, 230.1, 316.5, 176.1, 248/604; 224/929, 247; 24/303, 327, 305; 381/362, 363, 366, 368; 84/435
See application file for complete search history.

(56) References Cited

U.S. PATENT DOCUMENTS

| | | | | |
|---|---|---|---|---|
| 4,194,096 A | * | 3/1980 | Ramsey | 381/366 |
| 5,312,081 A | * | 5/1994 | Martin | 248/316.3 |
| 7,308,737 B2 | * | 12/2007 | Saitoh et al. | 24/303 |
| 2003/0035561 A1 | * | 2/2003 | Hsieh | 381/361 |

FOREIGN PATENT DOCUMENTS

JP 3093594 U 2/2003

* cited by examiner

*Primary Examiner* — Jack W Lavinder
(74) *Attorney, Agent, or Firm* — Manabu Kanesaka

(57) ABSTRACT

In a microphone holder, a microphone can be attached and detached by a one-touch operation and to be securely held. A microphone grip is pressed into between clamp arms in a state where front ends are opened. This causes the microphone grip to press rear ends of the clamp arms to swing the front ends in closing directions. Thus, the microphone can be attached and detached by a one-touch operation without causing collision noise and the like.

12 Claims, 2 Drawing Sheets

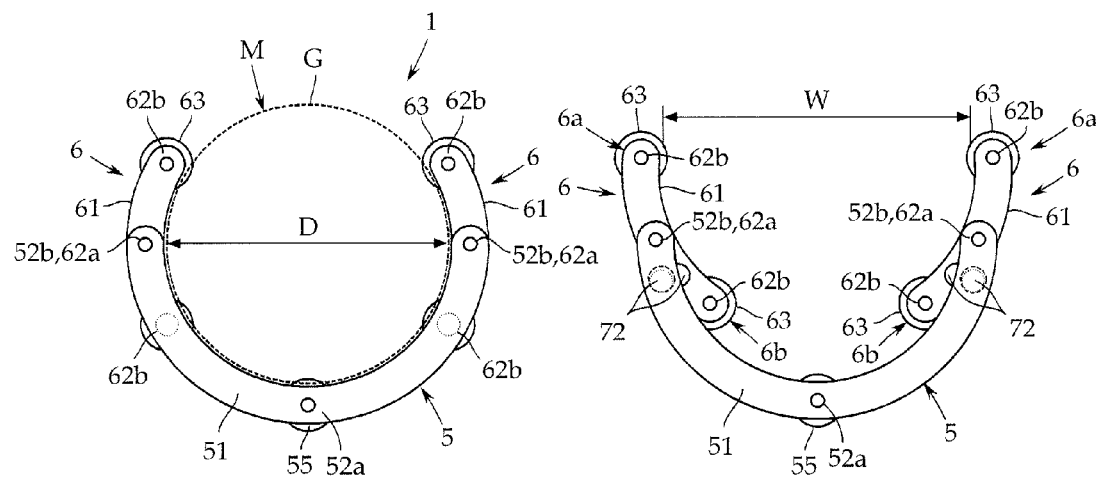
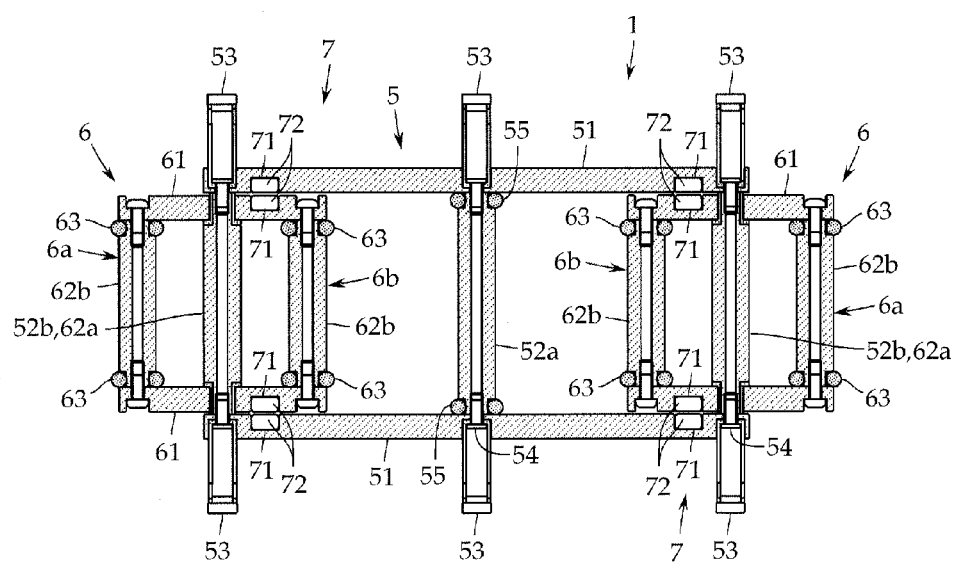

HOLDING DEVICE OF CYLINDRICAL BODY AND MICROPHONE HOLDER

CROSS-REFERENCE TO RELATED APPLICATION

The present application is based on, and claims priority from, Japanese Application Serial Number JP2011-195601, filed Sep. 8, 2011, the disclosure of which is hereby incorporated by reference herein in its entirety.

TECHNICAL FIELD

The present invention relates to a holding device of a cylindrical body that holds the body having a cylindrical shape to be held, and more specifically to a microphone holder that can hold a microphone grip, as the body to be held, easily and securely by a light operation.

BACKGROUND ART

An example of a holder that regards a cylindrical body as a body to be held is a microphone holder. In the case of holding a microphone at a prescribed position, a microphone stand is typically used. The stand includes a stand body placed on an installation surface, such as a floor. A microphone holder for holding the microphone is attached to the distal end of the stand body.

There are various types of microphone holders for respective uses. For instance, the most popular type is described in Japanese Utility Model No. 3093594. As described therein, a holder includes an elastically deformable clamp member formed to have a C-shaped section. The grip of a microphone is pressed into an opening of the holder, and elastically clamped.

However, such microphone holders are a forcedly fitting type according to which the opening of the clamp member is pressed open and the grip is mounted. Since a strong pressing force is required, this type is inferior in operability. Furthermore, when the grip is pressed against the opening to be forcedly fit, the microphone holder and the grip sometimes collide with each other and the microphone picks up collision noise caused by the collision.

Thus, microphone holders used for a hand-held microphone that frequently repeats attachment and detachment include a shock absorbing material that is made of an adhesive engineering plastic and adheres to the inner surface of the holder. However, this configuration is unfavorable in cost and causes a problem in that long-term deterioration of peeling off.

Another holding device holding any of cylindrical bodies equivalent to the microphone grips, for instance, a flashlight and various types of grips, adopts the forcedly fitting type and requires a strong pressing force. This causes a problem in inferior operability.

It is thus an object of the present invention to provide a holding device of a cylindrical body that can hold various types of cylindrical bodies, including a cylindrical microphone grip, more easily and securely, by a light operation.

SUMMARY OF THE INVENTION

In order to achieve the object, the present invention includes any of following characteristics. That is, a holding device of a cylindrical body adopting the cylindrical body as a body to be held, includes: an arc-shaped holding frame disposed along an outer circumferential surface of the cylindrical body; and a clamp arm swingably connected to at least one end of the holding frame, wherein an opening through which the body to be held can be inserted into an inside of the holding frame is formed by opening the clamp arm, and the holding frame and the clamp arm hold at least half a circumferential length of the outer circumferential surface of the cylindrical body by closing the clamp arm.

In a more preferable mode, the holding frame is disposed along the outer circumferential surface of the cylindrical body, formed into an arc shape having a length of a circumference equal to or less than half the circumferential length of the outer circumferential surface and includes a pair of clamp arms connected via swing shafts at opposite ends of the frame, each of the clamp arms is formed into an arc shape having a curvature identical to a curvature of the holding frame, the swing shaft is disposed at a substantial center of the clamp arm, and a sum of the length of the circumference from a front end of each of the clamp arms to the swing shaft and the length of the circumference of the holding frame is at least half of the length of the circumference of the cylindrical body.

Accordingly, pressing of the cylindrical body into between the clamp arms in the state where these arms are opened allows the cylindrical body to press the rear ends of the clamp arms to swing in directions where the front ends are closed. Thus, the cylindrical body can be held more easily and securely by a light operation without causing collision noise and the like.

In a more preferable mode, lock means for holding the clamp arm in a closed state is provided between the holding frame and the clamp arm. Accordingly, the body to be held can be held for a long time.

Furthermore, the clamp arm is disposed such that a part of the clamp arm and a part of the holding frame overlap with each other, and a pair of magnets, as the lock means, are provided on the overlapping opposite surfaces such that different poles are opposed to each other. This allows the clamp arm to be fixed using magnetic fixing force of the magnets.

Moreover, the clamp arm includes a pair of arm bodies disposed separated in an axial direction of the cylindrical body, and a plurality of connecting shafts bridging the arm bodies so as to connect the arm bodies to each other, and one of the connecting shafts also serves as the swing shaft of the clamp arm. This allows the entire cylindrical body to be gripped and to be held in a more secure state.

In a more preferable mode, vibration isolators which contact the outer circumferential surface are provided at least at opposite ends of the clamp arm. Accordingly, the cylindrical body can be prevented from input of a vibration and an impact.

The cylindrical body as the body to be held is a microphone grip; the present invention also includes a microphone holder for holding the microphone.

A more preferable mode of the microphone holder further includes a microphone mounter to be attached to a prescribed microphone stand, wherein the holding frame is held in a state of being suspended by a rubber cord-like vibration control member from the microphone mounter.

This allows the microphone to be easily attached and detached by a one-touch operation and enables the microphone to be securely held. Furthermore, a stand base for attaching the microphone to the microphone stand is provided. The holding frame is held in a state of being suspended from the stand base by the vibration control member. Accordingly, this technique is applicable to an environment of accurate recording, such as studio recording.

BRIEF DESCRIPTION OF THE DRAWINGS

FIG. 3A is a front view of the microphone holder in a state where a clamp arm is closed;

FIG. 3B is a front view of the microphone holder in a state where the clamp arm is opened; and FIG. 4 is a sectional view of the microphone holder in a state of being expanded into a plane.

DETAILED DESCRIPTION

An embodiment of the present invention will now be described with reference to drawings. However, the present invention is not limited thereto.

Figure 1A:
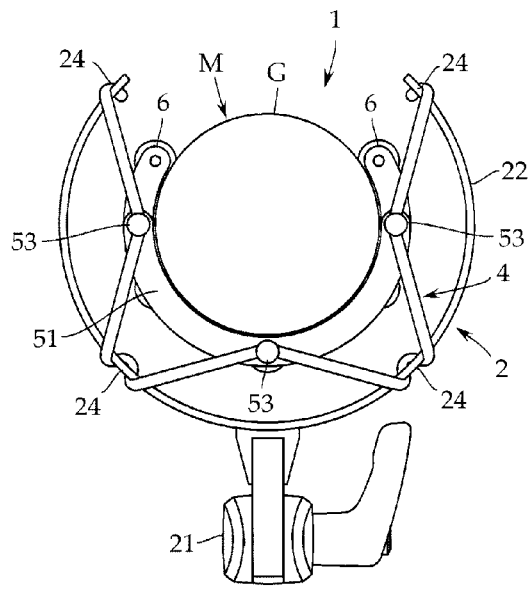
FIG. 1A is a front view of a microphone holder according to one embodiment of the present invention.

As shown in FIG. 1, a microphone holder 1 is for holding a microphone M including a cylindrical grip G, and preferably used in a state of being suspended by a vibration isolating rubber cord 4 from a microphone mounter 2 attached to a microphone stand, not shown. The microphone grip G does not necessarily have a simple cylindrical shape. Instead, this grip may be formed into a circular conical shape.

The microphone mounter 2 includes a base 21 to be attached to, for instance, the front end of the microphone stand and a hanger 22 swingably attached to the base 21, which are connected to each other swingably about a turning shaft 23.

The base 21 may be a molded article made of a rigid resin. A female thread is provided at the bottom (the right hand side in FIG. 1B) of this base. The female thread and a male thread, which is to be screwed into the female thread, are not shown.

Figure 1B:
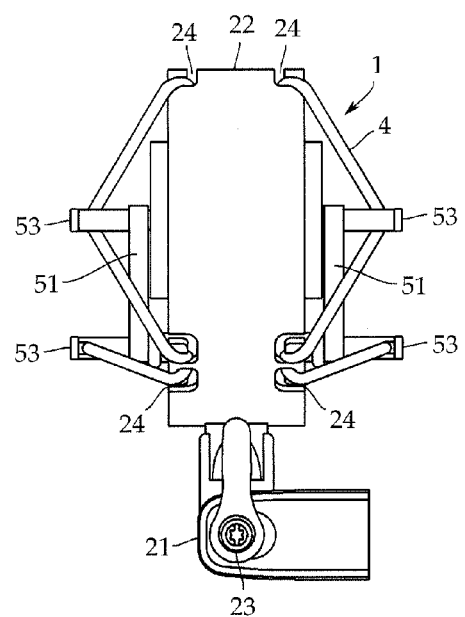
FIG. 1B is a side view of the microphone holder according to the embodiment of the present invention.

The hanger 22 may likewise be a molded article made of rigid resin, and includes a casing that has a C-shaped section and arranged along the outer circumference of the microphone holder 1 with a prescribed separation therefrom. As shown in FIG. 1B, hooks 24 by which the rubber cord 4 is hooked are provided on opposite sides of the hanger 22. In this example, the hooks 24 are provided at four sites on each side. The microphone holder 1 is held suspended within the hanger 22 by the rubber cord 4.

Instead, the hanger 22 may be made of steel and have a structure where a vibration control material adheres to the surface thereof, or have a structure made of a combination of a steel plate and a plastic. The specific form and specifications are arbitrary.

The microphone mounter 2 has any specific shape only if the mounter can hold the microphone holder 1 in a suspended manner. Any material and shape may be selected as those of the rubber cord 4 in conformity with specifications only if the cord is an elastic cord-shaped body that has an appropriate elasticity capable of suspending the microphone holder 1 and has vibration controllability for suppressing input of noise.

Figure 2:
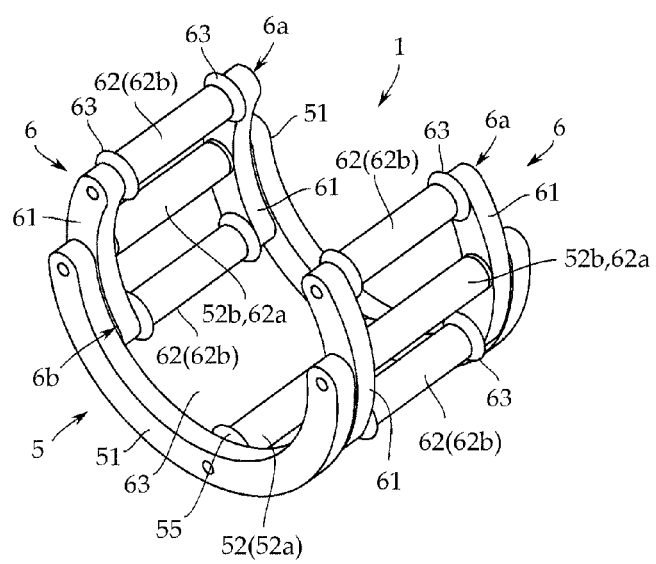
FIG. 2 is a perspective view of the microphone holder.

Next, also referring to FIGS. 2 to 4, the microphone holder 1 according to this embodiment includes: a holding frame 5 that has a C-shaped section formed to be arranged along the outer circumferential surface of the microphone grip G included in the microphone; and a pair of clamp arms 6 and 6 swingably attached to the respective opposite ends of the holding frame 5.

The holding frame 5 includes frame bodies 51 and 51 disposed to be opposite to and separated from each other by a prescribed interval along the axial direction of the microphone grip G, and has what is called a ladder-frame structure, in which, for instance, three connecting shafts 52 connect the frame bodies 51 and 51 to each other.

The frame bodies 51 and 51 configuring the holding frame 5 are formed into a circular arc shape whose length of the circumference is equal to or less than half of the length of the circumference of the microphone grip G. In this example, this length is half the length of the circumference.

In this example, the three connecting shafts 52 are fixedly screwed to opposite ends (52b and 52b) and the center (52a) of each frame body 51. However, any number and fixing positions of connecting shafts 52 may be selected and adopted in conformity with specifications.

As shown in FIG. 4, three hook rods 53, by which the rubber cord 4 is hooked to the microphone holder 1, are provided at respective positions on the outer surface of each of frame bodies 51 and 51. Each hook rod 53 is integrally fixed onto the outer surface of the frame body 51 together with a screw 54 for fixing the connecting shaft 52 to the frame body 51.

A vibration isolating ring 55 as a vibration isolator which contacts the microphone grip G is attached to the center connecting shaft 52a among the connecting shafts 52. The vibration isolating ring 55 is, for instance, a ring body made of an elastic rubber material. In this example, this ring is provided at each of the opposite ends of the connecting shaft 52a. Instead, this ring may be provided at the center of the connecting shaft 52a.

In this example, the vibration isolating ring 55 is provided at each of the opposite ends of the connecting shaft 52a. However, a vibration isolating ring 55 formed into a macaroni shape may be inserted over the connecting shaft 52a so as to cover the entire shaft. Instead, the ring is formed integrally on the surface of the connecting shaft 52a.

Next, each clamp arm 6 includes: a pair of arm bodies 61 and 61 disposed separated in the axial direction of the microphone grip G; and a plurality of connecting shafts 62 connecting the arm bodies 61 and 61 to each other.

The arm bodies 61 and 61 are formed into a circular arc shape as with the frame body 51 described above. In this example, the arm bodies are formed to have the length of the circumference shorter than the length of the circumference of the holding frame 5.

The connecting shafts 62 are arranged at the opposite ends (62b and 62b) and the center (62a) of the arm bodies 61 and 61. In this example, the connecting shafts 52b connecting the respective opposite ends of the frame bodies 51 also serve as the central connecting shafts 62a. The clamp arms 6 are connected to the respective opposite ends of the holding frame 5 swingably about the connecting shaft 52b (62a) as the swing shaft.

In this example, the swing shaft 62a is arranged at the substantially center of the clamp arm 6. However, the swing position may be any intermediate position between a front end 6a to a rear end 6b of the clamp arm 6.

A vibration isolating ring 63 as a vibration isolator in contact with the microphone grip G is attached to each of the connecting shafts 62b and 62b at the opposite ends of the clamp arm 6. In this example, the vibration isolating ring 63 is substantially the same as the vibration isolating ring 55 of the holding frame 5, and arranged at each of the opposite ends of each of the connecting shafts 62b and 62b, the ends being separated in the axial direction.

In the present invention, as shown in FIG. 3A, the holding frame 5 and the clamp arms 6 are formed into the circular arcs having the same curvature, and intermediate parts of the clamp arms 6 are attached to the respective opposite ends of the holding frame 5 swingably about the connecting shafts 52b (62a). Accordingly, the sum of the length of the circumference from the front end 6a to the swing shaft 62a of each of the clamp arms 6 and 6 and the length of the circumference of the holding frame 5 is at least half the length of the circumference of the microphone grip G.

Thus, in the state where the clamp arms 6 and 6 are closed, the holding frame 5 and the clamp arm 6 hold the microphone grip G around at least half the circumferential length of the outer circumferential surface of the grip. This prevents the grip from dropping off.

As shown in FIG. 3B, outwardly opening of the front ends 6a of the respective clamp arms 6 and 6 allows the opening width W of the microphone holder 1 to be larger than the diameter D of the microphone grip G. Accordingly, the microphone grip G can be smoothly inserted into and removed from the microphone holder 1 in a direction orthogonal to the axis.

As shown in FIG. 4, overlapping parts of the holding frame 5 and the clamp arms 6 and 6 are provided with lock means 7 for holding the respective clamp arms 6 and 6 in a closed state.

In this embodiment, the lock means 7 includes: a recess 71 on the side of the holding frame 5 and a recess 71 on the side of the clamp arm 6 that are formed opposite to each other when each of the clamp arms 6 and 6 is closed (see FIG. 3A); and a pair of magnets 72 and 72 arranged in the respective recesses.

In this example, neodymium magnets causing a strong magnetic fixing force are adopted as the magnets 72 and 72, which are arranged such that different poles are opposite to each other.

Accordingly, in a state where the clamp arms 6 are overlap with the holding frame 5, that is, a state where the clamp arms 6 and 6 are closed, the magnets 72 and 72 are opposed and the different poles are attracted to each other. The magnetic attraction force allows the clamp arms 6 and 6 to be held in the closed state.

Next, an example of procedures for using the microphone holder 1 will be described. First, the rubber cord 4 is hanged at the hook rods 53 of the microphone holder 1. The rubber cord 4 is further hanged at the hooks 24 of the microphone mounter 2 such that the microphone holder 1 is suspended.

Next, the front end 6a of each of the clamp arms 6 and 6 is outwardly opened so as to be resisted to the magnetic fixing force of the magnets 72 and 72. This swings the clamp arm about the swing shaft 52a, and the rear end 6b of each of the clamp arms 6 and 6 extends to the inside of the holding frame 5.

The microphone is pressed from the widened opening at the front ends 6a of the clamp arms 6 and 6 into the center of the holding frame 5.

The microphone M comes into contact with the rear end 6b of each of the clamp arms 6 and 6. Further pressing by the microphone closes the front end 6a of each of the clamp arms 6 and 6. Subsequently, when the clamp arms 6 and 6 reach respective positions where the magnets 72 and 72 are opposite to each other, the magnetic fixing force of the magnets 72 and 72 fixes the clamp arms 6 and 6.

In this example, the structure of a type of microphone holder 1 that holds a large-diameter capacitor microphone for studio recording has been exemplified. For instance, a typical dynamic microphone, capacitor microphone or the like may be adopted.

In this example, the microphone holder 1 is suspended by the rubber cord 4 from the microphone mounter 2. However, a mode where the microphone holder 1 is solely attached to the microphone stand may be adopted.

In this example, the case where the microphone holder 1 horizontally holds the microphone M has been exemplified. However, vertical orientation of the microphone holder 1 allows the microphone M to be held in a vertically standing state. The holding orientation by the microphone holder 1 is not particularly limited.

In this example, the microphone grip G is vibration-isolated and prevented from slipping so as not to deviate from the holding position by the vibration isolating rings 55 and 63. In order to improve the close contact force between the microphone holder 1 and the microphone grip G, a non-slip sheet, for instance, a rubber sheet, may intervene therebetween to more securely prevent microphone grip G from positionally deviating.

Furthermore, in this embodiment, the description has been made using the case of application to the microphone holder for holding the microphone grip as a cylindrical body to be held. However, the holding device of a cylindrical body according to the present invention is not limited thereto. More specifically, for instance, a bottle, a can, a PET bottle, a mug, a cup or the like can be held, and the grip of a flashlight, a mop or the like can also be held.

The invention claimed is:

1. A holding device for holding a cylindrical body, comprising:
    an arc-shaped holding frame disposed along an outer circumferential surface of the cylindrical body and having a first magnet;
    a clamp arm having a second magnet at a first end part thereof and a swing shaft at a substantial center thereof so that the clamp arm is swingably connected to at least one end of the holding frame through the swing shaft; and
    another clamp arm comprising a third magnet,
    wherein an opening through which the body to be held can be inserted into an inside of the holding frame is formed when the clamp arm is open,
    the holding frame and the clamp arm hold at least half a circumferential length of the outer circumferential surface of the cylindrical body when the clamp arm is closed,
    the first magnet and the second magnet are disposed where the first end part of the clamp arm and the holding frame overlap with each other when the clamp arm is closed,
    the holding frame further comprises a first frame body, a second frame body, a frame shaft connecting the first frame body and the second frame body, and a fourth magnet at a second end part of the holding frame,
    the third magnet and the fourth magnet are disposed where the second end part of the holding frame and the another clamp arm overlap with each other when the another clamp arm is closed, and
    the clamp arm further comprises a first arm body, a second arm body, and two arm shafts, the first arm body and the second arm body being connected with each other through the frame shaft and the arm shafts.

2. The holding device according to claim 1, wherein the holding frame has a length of a circumference equal to or less than half the circumferential length of the outer circumferential surface, and a pair of clamp arms is connected via swing shafts at opposite ends of the frame,
    each of the clamp arms is formed into an arc shape having a curvature identical to a curvature of the holding frame, the swing shaft is disposed at a substantial center of the clamp arm, and
    a sum of the length of the circumference from a front end of each of the clamp arms to the swing shaft and the length of the circumference of the holding frame is at least half of the length of the circumference of the cylindrical body.

3. The holding device according to claim 1, wherein the first and second magnets form a lock unit for holding the clamp arm in a closed state between the holding frame and the clamp arm.

4. The holding device according to claim 1, wherein the clamp arm is disposed such that a part of the clamp arm and a part of the holding frame overlap with each other, and
   the first magnet and the second magnet, as a lock unit, are provided on the overlapping opposite surfaces such that different poles are opposed to each other.

5. The holding device according to claim 1, wherein one of the arm shafts also serves as the swing shaft of the clamp arm.

6. The holding device according to claim 1, wherein vibration isolators which contact the outer circumferential surface are provided at least at opposite ends of the clamp arm.

7. A microphone holder, comprising the holding device according to claim 1, wherein the body to be held is a microphone grip.

8. The microphone holder according to claim 7, further comprising a microphone mounter to be attached to a prescribed microphone stand, wherein the holding frame is held in a state of being suspended by a rubber cord-like vibration control member from the microphone mounter.

9. The microphone holder according to claim 1, wherein the frame shaft includes a vibration isolating ring at an end part thereof.

10. The microphone holder according to claim 9, wherein
   the another clamp arm comprises a third arm body, fourth arm body, another two arm shafts, and
   the third arm body and the fourth arm body are connected with each other through a frame shaft and two arm shafts.

11. The microphone holder according to claim 10, wherein the arm shafts and the frame shafts each include a vibration isolating ring at an end part of the shafts, respectively.

12. The microphone holder according to claim 11, wherein the first magnet, the second magnet, the third magnet, and the fourth magnet comprise neodymium magnet.

\* \* \* \* \*